Figure 1:
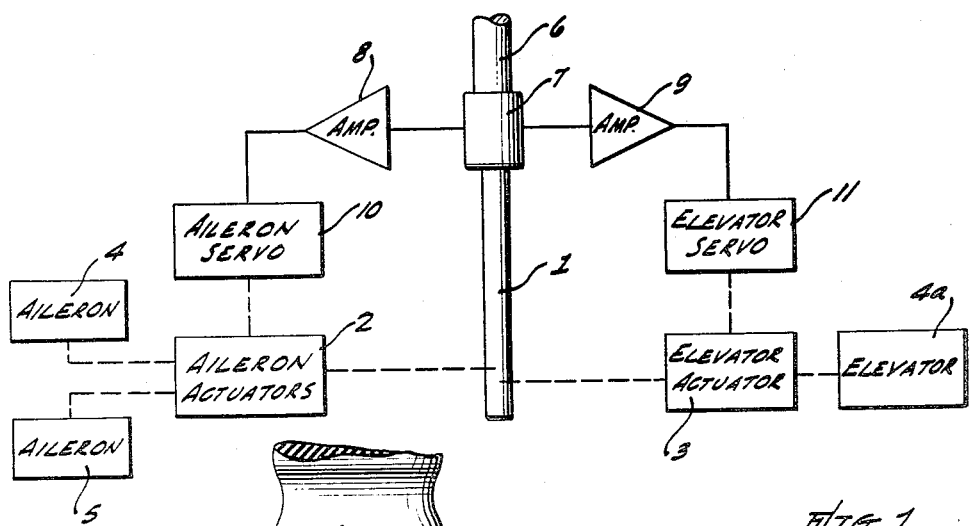

April 26, 1960     J. VISSER     2,934,292

CONTROL STICK FORCE SENSOR

Filed June 10, 1957     2 Sheets-Sheet 1

INVENTOR.
JACOB VISSER,
BY Harold J. Downs
ATTORNEY

April 26, 1960  J. VISSER  2,934,292
CONTROL STICK FORCE SENSOR
Filed June 10, 1957  2 Sheets-Sheet 2

INVENTOR.
JACOB VISSER,
BY
Harold J. Downes
ATTORNEY.

United States Patent Office 2,934,292
Patented Apr. 26, 1960

2,934,292

CONTROL STICK FORCE SENSOR

Jacob Visser, Grand Rapids, Mich., assignor to Lear, Incorporated

Application June 10, 1957, Serial No. 664,526

5 Claims. (Cl. 244—83)

This invention relates to control systems for aircraft, and particularly to a control system for the roll and pitch axes of an airplane employing a control stick having a force sensor sensitive to lateral and longitudinal forces exerted on the stick by the pilot.

As manned aircraft have grown larger and flown faster, forces necessary to control their flight attitudes have become successively greater. To relieve the pilot of the increased physical effort thus required, various systems have, in the past been devised. Some of these have taken the form of signal generators with which, by means of a knob or control, the pilot is enabled to command action on the part of the control surfaces of the airplane to cause it to fly in a manner varied by his movement of the control knob. However, this type of device is typically lacking in one essential feature, namely, there is no provision of a means for supplying a physical sensation to the pilot in response to the reaction of the airplane under his command, nor to the magnitude of the force the control system at his command is applying to the aircraft.

The control stick of an airplane under manual control is utilized to control the aircraft in pitch and in roll, longitudinal motion of the stick resulting in an upward or downward deflection of the elevator of the airplane, and lateral motion of the stick resulting in differential deflection of the ailerons in one direction or the other. These deflections cause pitching or rolling displacement of the airplane, respectively. In systems devised in the past for providing both boost of the control force system of the airplane and a sensation of the reaction of the airplane to the pilot, two notable defects are apparent. First, the linkages, whether hydraulic, mechanical, or electrical, have nearly always suffered from the presence of hysteresis, i.e., a displacement of the stick in one direction or the other, followed by removal of the force causing the displacement, would result in a residual bias error which could not be eliminated. These hysteresis errors sometimes resulted from friction, lost motion in linkages, etc.; but from whatever cause, the result was that the pilot found it necessary to exert a steady biasing force in order to keep the airplane in straight and level flight.

The second defect noted was that lateral deflection of the control stick to achieve a desired attitude of the aircraft in roll nearly always resulted in the introduction of at least some pitch command, and vice versa. In other words, the systems thus far devised have had an unavoidable interaction or cross talk between the pitch and roll controls such that introduction of pitch command nearly always required a roll correction, and the introduction of a roll command required thereafter a pitch correction.

It is therefore an object of this invention to provide means for controlling the roll and pitch attitude of an aircraft with a single control stick and without interaction between pitch and roll command.

It is another object of this invention to provide means for controlling an aircraft in pitch and roll, without hysteresis.

It is another object of this invention to provide means for controlling the pitch and roll attitude of an airplane with a minimum of physical effort.

It is another object of this invention to provide a control stick capable of both manual and servo control of an aircraft in roll and pitch and in various combinations of roll and pitch.

Figure 2:
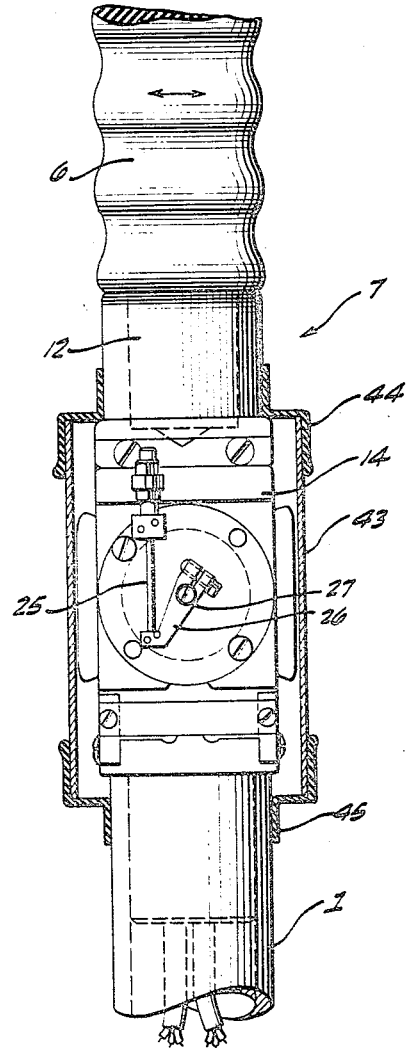
Figure 5:
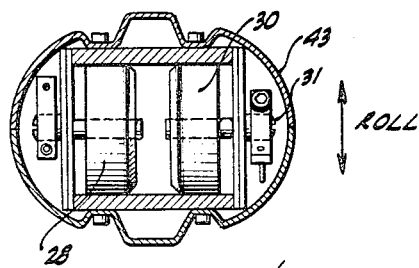
Figure 3:
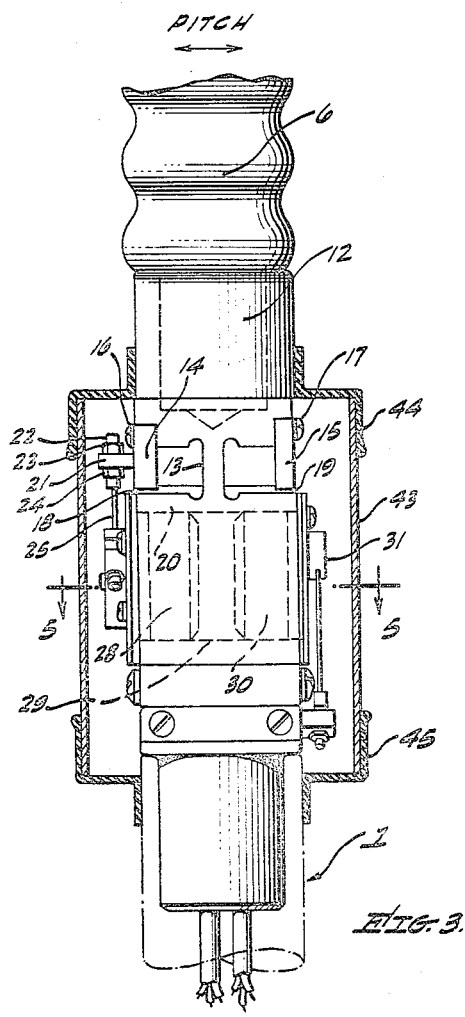
Figure 4:
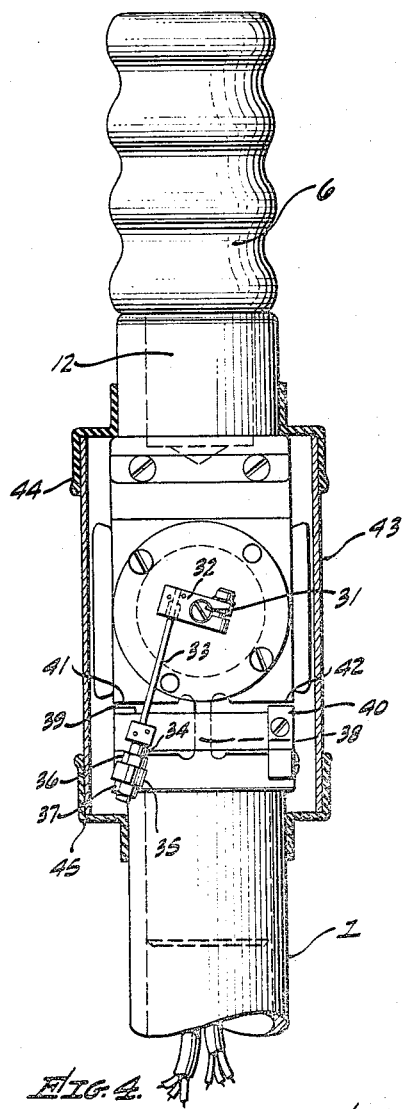

Other objects of invention will become apparent from the following description taken in connection with the accompanying drawings, in which:

Fig. 1 is a schematic drawing of the invention;
Fig. 2 is an elevational view of a part of the invention;
Fig. 3 is a side view of a portion of the invention;
Fig. 4 is a rear view of a portion of the invention, and
Fig. 5 is a sectional view of the invention, taken at 5—5 in Fig. 3.

Referring to Fig. 1, a control stick 1, mounted in a conventional manner in an aircraft, is connected mechanically or hydraulically in a manner well known in the art, to aileron actuators 2 and elevator actuator 3. Aileron actuators 2 operate ailerons 4 and 5, and elevator actuator 3 operates elevator 4a in the conventional manner. Attached to stick 1 and disposed between stick 1 and stick handle 6 is force sensor assembly 7, shown in detail in Figs. 2, 3, 4 and 5. Force sensor assembly 7 incorporates electrical pickoffs to be hereinafter described, which feed command signals to amplifiers 8 and 9, which in turn control aileron and elevator servos 10 and 11, respectively, as shown in Fig. 1.

Referring now to Figs. 2, 3, 4 and 5, the details of sensor assembly 7 are shown. Sensor assembly 7 is comprised essentially of a sensor member 12 of some homogeneous structural material such as steel or beryllium copper, or any non-hysteresis or very low hysteresis material, and which is adapted to be attached at its upper and lower ends, respectively, to handle 6 and stick 1. At the upper and lower ends of the sensor, its cross-section is roughly cylindrical to receive the handle and stick, respectively, as shown. The upper middle section of the sensor is machined to be of relatively thin and uniform cross-section to form a cantilever beam member 13. It is thus seen that at this section, sensor 12 is relatively weak in bending about an axis normal to the plane of the paper in Fig. 3. Stop members 14 and 15 are attached to the upper part of sensor 12 by means of studs 16 and 17, respectively, and serve to limit bending of section 13 about its neutral axis. It will be noted that gaps 18 and 19 between stops 14 and 15, respectively, and central body 20 of sensor 12 permit limited bending deflection of section 13. Attached to stop member 14 is a bracket 21 to which a bolt 22 is attached rigidly by means of adjustment nuts 23 and 24. Bolt 22 is, in turn, attached to rod 25 which, at its opposite end, is attached to bell crank 26 which in turn is attached to shaft 27 of rotary pickoff 28 housed in one-half of cylindrical cavity 29 in body 20. Rod 25 is flexible and able to allow a turning of crank 26 without the use of moving parts, thus avoiding all backlash and the hysteresis which would ordinarily be associated therewith.

The other half of cylindrical cavity 29 in body 20 houses rotary pickoff 30 having a shaft 31 which is integrally attached to a bell crank 32 connected in turn to a rod 33, which in turn is attached to a bolt 34 secured to a bracket 35 by means of adjustment nuts 36 and 37, as shown. Bracket 35 is attached to the lower portion of sensor 12, as shown in Fig. 4. A second cantilever beam section 38 disposed at 90° with respect to section 13, attaches body 20 of the sensor to the lower portion thereof, as shown in Fig. 4. This section, like section 13, is of relatively thin cross-section in a dimension perpendicular to the thin section of section 13 so that it is relatively weak in bending about the roll axis of the airplane, while section 13 is relatively weak in bending about the pitch axis of the airplane. Stop members 39 and 40 limit the extent to which section 38 may be bent, and these stop members are attached to the lower portion of sensor 12, leaving gaps 41 and 42 between stops 39 and 40, respectively, and body 20 of the sensor. A cylindrical metallic sheath 43 surrounds the entire assembly and is held in place without imposition of appreciable restraints by means of flexible annular rings 44 and 45.

In operation, when it is desired to initiate a maneuver of the aircraft requiring a change in the pitch attitude of the aircraft, the pilot applies fore and aft, i.e., longitudinal, force to the handle of the stick in a similar manner as he would do if he were operating a conventional mechanical control system such as is incorporated in most light planes and in all old vintage aircraft. A longitudinal force applied to the handle of the stick results in deflection of section 13 shown in Fig. 3 and the transmittal of a corresponding deflection through rod 25 and bell crank 26 to shaft 27 of pickoff 28. Pickoff 28 generates a signal proportional to the magnitude of the deflection. Of course, the force with which the stick apparently resists the pilot's hand is proportional to the deflection. Since section 13 operates as a cantilever beam and within the elastic limit of the material, force and deflection are proportional. The pilot therefore senses very directly the magnitude of the signal produced by the pickoff, because the pickoff signal and the reactive force of the stick are strictly proportional. Also, as the control system responds, the stick moves because, as shown in Fig. 1, it is reversibly tied mechanically to the remainder of the control system. If now a greater force is applied, a greater reactive force results along with a greater pickoff signal, and this relation continues until either gap 18 or gap 19 is closed. Beyond this point, the force of the pilot upon the stick is resisted by the control system to the same extent as the application of similar forces to an unboosted system.

The signal from pickoff 28 is fed to amplifier 9, as shown in Fig. 1, where the signal is amplified and used to actuate elevator servo 11, which in turn controls elevator actuator 3 connected to operate elevator 4a. Operation of the elevator results in the prescribed change in the pitch attitude of the aircraft and also results in movement of the stick in proportion to the movement of the elevator due to linkage interposed therebetween. When such change in pitch attitude as the pilot desires has been attained, he ceases the application of force to the handle 6 of the stick, and the signal output of pickoff 28 is immediately returned to zero because, again, within the elastic limit of the material forming sensor 12, it returns to its original undeflected position. Thus, there is no hysteresis in the control loop, because stops 14 and 15 are so placed and adjusted and the magnitude of gaps 18 and 19 is so predetermined that these gaps are closed before the material forming section 13 can exceed its elastic limit.

In a similar manner, the application of lateral forces results in the deflection of section 38 in the lower portion of the sensor and the similar rotation of the rotor of pickoff 30, as may be seen from an inspection of Fig. 4. Gaps 41 and 42 are so predetermined and adjusted by means of adjustments 39 and 40 that the elastic limit of the material forming section 38 cannot be exceeded, and at the conclusion of the desired rolling maneuver, section 38 returns to its original undeflected position, and pickoff 30 returns to its neutral poistion at which no output signal is produced. When a lateral force is applied to the stick, the signal from pickoff 30 is supplied to amplifier 8, and the amplified signal from amplifier 8 is connected to control the operation of aileron servo 10, which in turn controls aileron actuators 2 which supply force to the ailerons 4 and 5, which in turn cause rolling motion of the aircraft. It can be seen from Figs. 2, 3, and 4 that if no force is applied to the stick, no signal is generated by either of pickoffs 28 or 30, and no force is applied to the elevators or ailerons through the servo system, nor does the stick move. Accordingly, if the mechanical control system is itself biased to the neutral position, the aircraft then flys straight and level. If a lateral force is applied to the stick, the stick moves laterally and only rolling motion of the aircraft results, because lateral force only upon the stick does not affect the position of pickoff 28 which controls the pitch attitude of the airplane. This must be true, because section 13, while relatively weak in bending about the pitch axis of the airplane, is extremely strong in bending about the roll axis of the airplane and simply does not deflect when a lateral force is applied to the stick. Conversely, when a longitudinal force is applied to the stick, only section 13 and not section 38 deflects, since section 38 is very strong in bending about the pitch axis of the airplane and weak in bending—and hence deflects—only about the roll axis. Consequently there is no interaction between the two types of control, i.e., application of a lateral force to the stick never results in a change in the pitch attitude of the airplane; and the application of a longitudinal force to the stick never results in a change in the roll attitude of the airplane. Thus, all objectionable interaction between roll and pitch control of the airplane is eliminated. However, a combined output for pitch and roll can be attained by movement of the stick in a direction which is not mutually perpendicular to either pitch or roll.

Since, as previously explained, all hysteresis effects have been eliminated by virtue of the provision of elastic sections 13 and 38, and since these sections have been disposed at mutually perpendicular attitudes, there has thus been provided a device for controlling the pitch and roll attitude of an airplane which is both hysteresis free and free of objectionable interaction between control modes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Aircraft roll and pitch control means comprising a stick member bendable about mutually perpendicular transverse axes and having stops to prevent deformation beyond the elastic limit thereof, said stick member including one section having minimal stiffness about one of said axes and maximal stiffness about the other of said axes and a second section having maximal stiffness about said one axis and minimal stiffness about said other axis, means producing independent electrical signals in response to bending about said axes, and means responsive to said signals for controlling an aircraft in pitch and roll.

2. Means for controlling the pitch and roll attitudes of an aircraft comprising a control system including a control stick, pitch control surfaces on said aircraft, roll control surfaces on said aircraft, and means for moving said pitch and roll surfaces in response to longitudinal and lateral motion of said control stick, an insert in the body of said stick having a first section weaker in bending due to longitudinal forces exerted thereon than in bending due to lateral forces exerted thereon, and a second section weaker in bending due to lateral forces exerted thereon than in bending due to longitudinal forces exerted thereon, pickoff means for generating electrical signals in response to said lateral and longitudinal bending forces, and servo means responsive to said signals for actuating said control surfaces to control said aircraft in roll and pitch.

3. A device as recited in claim 2 and further comprising rigid stop means on said insert to restrain longitudinal and lateral bending thereof beyond a predetermined deflection.

4. Means for producing first and second electrical signals proportional respectively to components of force along two different preselected axes in space comprising a cantilever beam independently deformable in response to components of force along said two axes in accordance with Hooke's law and having in separate sections thereof reduced section moduli about two mutually perpendicular axes respectively normal to said force components, means for limiting the magnitude of said deformations, and means for producing independently electrical signals proportional to said deformations.

5. An aircraft control device comprising a control stick having two axially spaced separate sections mutually orthogonally disposed about a common axis, said sections being of reduced section modulus and pickoffs arranged about the weaker axis of said sections to generate independent electrical signals due to bending of said sections.

References Cited in the file of this patent

UNITED STATES PATENTS

| | | |
|---|---|---|
| 2,583,828 | Gerstenberger | Jan. 29, 1952 |
| 2,614,776 | Rossire | Oct. 21, 1952 |
| 2,626,115 | Atwood et al. | Jan. 20, 1953 |

FOREIGN PATENTS

| | | |
|---|---|---|
| 1,104,903 | France | June 22, 1955 |